United States Patent Office 3,536,466
Patented Oct. 27, 1970

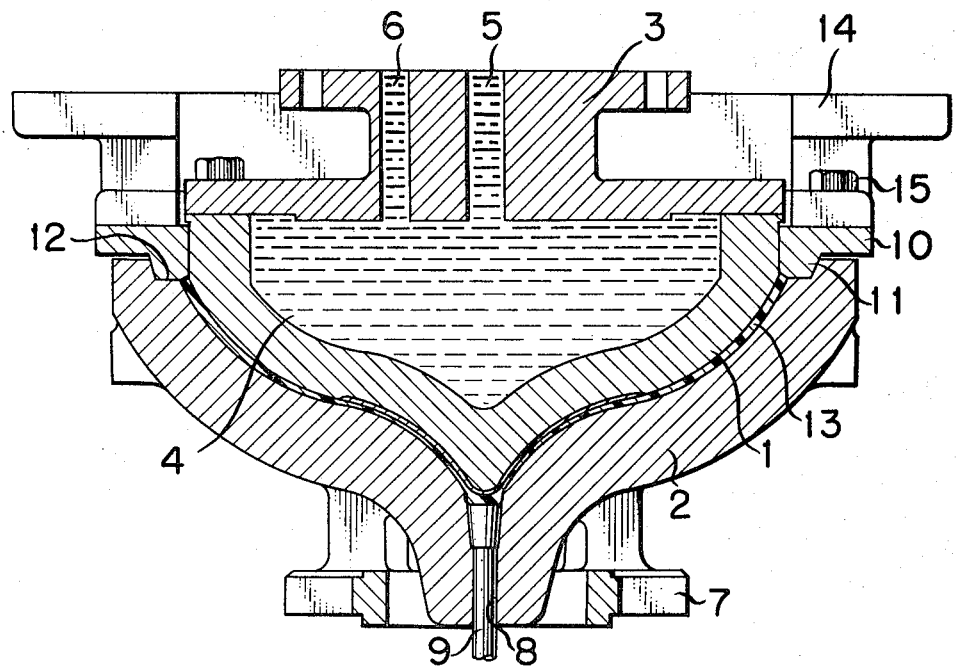

3,536,466
COMPRESSION MOULD ASSEMBLY FOR PRODUCING GLASS ARTICLES OF UNEVEN THICKNESS
Takaaki Kurokawa, Chigasaki-shi, Mitsugu Fukuda, Kawasaki-shi, and Junji Yamada, Odawara-shi, Japan, assignors to Tokyo Shibaura Electric Co., Ltd., Kawasaki-shi, Japan, a corporation of Japan
Filed Feb. 21, 1968, Ser. No. 707,037
Int. Cl. C03b *11/10*
U.S. Cl. 65—181
2 Claims

ABSTRACT OF THE DISCLOSURE

A mould assembly for producing a glass article of uneven thickness having a relatively thinner portion comprises mould sections having pressing surfaces which compress a glass body therebetween. One mould has a coating fused on only a part of its pressing surface, and this part is that part of the mold surface which produces the thinner portion of the glass body.

---

This invention relates to a compression mould assembly for producing a glass article of uneven thickness, and is concerned particularly, but not exclusively, with a mould assembly for forming a cone-shaped section, commonly called a "flute," of a cathode-ray tube.

It is necessary that a mould assembly of the type described has various properties such as resistances to heat repeatedly applied to the pressing surface of the mould, reistance to a mechanical impact, and withstands thermal oxidation and corrosion which tend to be caused when the vitreous body is treated in the mould at elevated temperatures due to the action of salts contained in the vitreous body. To satisfy this condition, various types of cast iron, ferritic or austenitic heat-resisting steel, or ferritic stainless steel have been used as the material of the mould.

The mould made of these materials has a sufficiently suitable degree of expansion efficiency and a heat-transfer coefficient, as well as an excellent machinability, so that a glass article obtained may have a fine finished surface.

Such a conventional mould, however, is incapable of producing a desirably shaped glass article of uneven thickness, since with regard to the thinner part of the shaped vitreous body the heat-conduction takes place earlier than for the other part and solidifies at an excessive rate, before the compressing operation is completely finished.

An object of this invention is to provide a compression mould assembly for producing a glass article of uneven thickness and additionally to eliminate or reduce the occurrence of inferior or condemned goods.

A compression mould assembly for producing a glass article of uneven thickness according to this invention comprises moulds having pressing surfaces which compress therebetween a vitreous body to a suitable form, wherein the major part of each of the moulds is made of steel selected from the group consisting of carbon steel containing less than 0.3 percent carbon, ferritic stainless steel or ferritic heat-resisting steel containing less than 0.4 percent carbon, austenitic stainless steel and austenitic heat-resisting steel, and that portion of the surface of at least one of the moulds which compresses the vitreous body to form a relatively thin part of the glass article is made of an alloy of a nickel-chromium-boron base having a Rockwell hardness of less than 45.

In practice, the particular portion of the surface of at least one of the moulds described above is preferably made of a heat-resisting alloy consisting of 75 to 90 percent nickel, 4 to 18 percent chromium, 0.75 to 4.5 percent boron, and contains iron, silicon and carbon whose total content is less than 10 percent.

The single figure shows a vertical sectional view of the mould assembly according to this invention.

Referring to the drawing, the mould assembly comprises a pair of moulds, one of which is called an upper mould or plunger 1 and the other of which is called a bottom mould 2.

The plunger 1 is secured by means of bolts to a plunger adapter 3 hung from a ram (not shown) vertically extending downwards, and has a cooling chamber 4 defined by the inner wall thereof to store a liquid coolant, such as water, so as to maintain the plunger at a temperature sufficiently low to effect proper heat-exchange and solidification operations. The adapter is provided with inlet passage 5 and outlet passage 6 which connect the cooling chamber with a water circulation system (not shown) including a suitable pumping means, and through which the coolant may circulate.

The bottom mould 2 has an attachment 7 integrally formed therewith at the bottom to be fixedly secured to a mould holder (not shown), and a hole 8 for guiding a knock-out pin 9, formed therein at the center portion of the bottom.

A ring 10 constituting one of the three constituent elements of the mould assembly is coaxially disposed with respect to the plunger 1 and has an annular portion 11 fitted to a stage 12 formed in the inside edge of the upper portion of the bottom mould. The inside surface of the annular portion 11 is slidably fitted in the surrounding surface of the upper portion of the plunger 1 when the plunger compresses a vitreous body 13 together with or against the bottom mould to cause the vitreous body to be formed into a suitable configuration.

The ring 10 is fixedly secured to a ring adapter 14 by means of bolts 15, the ring adapter 14 being secured to a driving means (not shown) and vertically movable therewith.

In this case, the bottom mould and the major portion of the plunger are preferably made, for instance, of heat-resisting steel containing 13 percent chromium, and that portion of the surface of the plunger which forms a relatively thin part of the vitreous body to be shaped, may be made of an Ni-Cr-B base alloy containing 90 percent nickel, 5 percent chromium, 1 percent boron and a balance of Fe+Si+C whose total content is 4 percent (and having a Rockwell hardness of 20), or containing 80 percent nickel, 11 percent chromium, 3 percent boron and a balance of Fe+Si+C whose total content is 6 percent (and having a Rockwell hardness of 40).

The surface of the plunger is formed by the steps of fusing the Ni-Cr-B base alloy to a body of the plunger made of heat-resisting steel at a predetermined portion of the surface of the body by the heating energy of a gaseous mixture of oxygen-acetylene. The alloy has a thickness of five or six millimeters, and some portions of the alloy are cut off so as to cause the remainder thereof to form the desired bottom portion of the mould 1 wherein the remainder has a thickness of two or three millimeters. The alloy has a heat conduction efficiency lower than that of the steel forming the remainder of the pressing surface of the mold in order to facilitate the formation of the relatively thinner portion of the glass body.

In operation, the plunger 1 is first lifted from the bottom mould 2 and then the vitreous body is fed into the mould 2. The ring 10 is set on the stage of the mould 2 and simultaneously the plunger 1 is lowered with the ram pressed downwards.

The vitreous body thus charged is compressed between the moulds so as to be formed into a desired shape of glassware of uneven thickness. After the vitreous body is solidified, the shaped body to be finished is finally removed from the mould 2 by lifting the plunger and pushing the knock-out pin upwardly.

The mould assembly according to this invention is conveniently employed in the technical field of manufacturing the cone-shaped portion of a cathode-ray tube.

Unless otherwise specifically stated, all percentages given herein are by weight.

The advantage of this invention is to prevent a relatively thin part of the vitreous body to be shaped from being cooled earlier than the other parts in the mould assembly before the compressing operation is entirely finished. Therefore, it is important that such portion of the surface of at least one of the moulds that serves to form the relatively thin part of the glassware is made of an Ni-Cr-B base alloy.

While the invention has been described in connection with some preferred embodiments thereof, the invention is not limited thereto and includes any modifications which fall within the true spirit and scope of the invention as defined in the appended claims.

What is claimed is:

1. In a compression mold assembly for producing a glass article of non-uniform thickness, having at least one portion which is relatively thinner than the remainder of the article, comprising opposed molds having pressing surfaces which compress therebetween a glass body to produce said article of non-uniform thickness, wherein the major part of each of the molds is made of a steel selected from the group consisting of carbon steel containing less than 0.3 percent carbon, ferritic stainless steel, ferritic heat-resisting steel containing less than 0.4 percent carbon, austenitic stainless steel, and austenitic heat-resisting steel, the improvement which comprises:

one mold having a coating fused on only a part of its pressing surface, said part being that part of the mold surface which produces the thinner portion of the glass body and said coating consisting essentially of a nickel, chromium, boron base alloy having a Rockwell hardness less than 45, said alloy having a heat conduction efficiency lower than that of the steel forming the remainder of the pressing surface of said mold, so that the formation of the relatively thinner part of said glass body is facilitated.

2. The compression mold assembly of claim 1 in which said Ni-Cr-B base alloy coating has a thickness of 2–3 millimeters.

References Cited

UNITED STATES PATENTS

| | | | |
|---|---|---|---|
| 2,936,229 | 5/1960 | Shepard. | |
| 3,204,917 | 9/1965 | Richards | 117—130 |
| 3,318,694 | 5/1967 | Heitmann | 65—374 |
| 3,202,498 | 8/1965 | Torok | 65—362 |
| 3,258,324 | 6/1966 | Torok | 65—362 |

S. LEON BASHORE, Primary Examiner

E. R. FREEDMAN, Assistant Examiner

U.S. Cl. X.R.

65—362, 374; 117—130